United States Patent
Lynn

(10) Patent No.: US 6,837,463 B2
(45) Date of Patent: Jan. 4, 2005

(54) RAM AIR INFLATED WING

(76) Inventor: Peter Robert Lynn, 105 Alford Forest Road, Ashburton (NZ)

(*) Notice: Subject to any disclaimer, the term of this patent is extended or adjusted under 35 U.S.C. 154(b) by 0 days.

(21) Appl. No.: 10/203,303

(22) PCT Filed: Feb. 9, 2001

(86) PCT No.: PCT/NZ01/00019
§ 371 (c)(1),
(2), (4) Date: Nov. 13, 2002

(87) PCT Pub. No.: WO01/58755
PCT Pub. Date: Aug. 16, 2001

(65) Prior Publication Data
US 2003/0132348 A1 Jul. 17, 2003

(30) Foreign Application Priority Data
Feb. 10, 2000 (NZ) ............................................. 502790

(51) Int. Cl.[7] .............................................. B64D 17/02
(52) U.S. Cl. ........................ 244/146; 244/900; 244/902
(58) Field of Search ...................... 244/146, 24, 153 R, 244/900, 902

(56) References Cited

U.S. PATENT DOCUMENTS

| | | | |
|---|---|---|---|
| 4,363,458 A | * 12/1982 | Jones et al. | 244/153 R |
| 4,708,078 A | 11/1987 | Legaignoux et al. | |
| 5,028,018 A | * 7/1991 | Krebber | 244/146 |
| 5,169,092 A | * 12/1992 | Murakami | 244/145 |
| 5,213,289 A | * 5/1993 | Barresi | 244/145 |
| 5,573,207 A | * 11/1996 | Germain | 244/145 |
| 5,620,153 A | * 4/1997 | Ginsberg | 244/13 |

FOREIGN PATENT DOCUMENTS

WO     WO 90/05663     5/1990

* cited by examiner

Primary Examiner—Peter M. Poon
Assistant Examiner—Timothy D. Collins
(74) Attorney, Agent, or Firm—Barry R. Lipsitz; Douglas M. McAllister

(57) ABSTRACT

A wing for a traction kite, etc comprises a plurality of cells formed by chordwise-extending ribs (3), valved openings (6) to the cells allowing ram air to inflate the wing. By changing the initial cut-out of the material forming the cells near wing tips (7, 8), compared with that of the cells central to the wing, it is possible to alter the aerodynamic forces at wing tips (7, 8). This allows attachment of flying lines (9, 10) to wing tips (7, 8) only, despite the wing having no framing to maintain its spanwise shape under the loading of flying lines (9, 10). The increased aerodynamic forces at wing tips (7, 8) are achieved by making the aerofoil profiles of the cells progressively more reflexive towards wing tips (7, 8), by giving wing tips (7, 8) a residual twist increasing their angle of incidence, by placing the centres of pressure of the cells near wing tips (7, 8) somewhat forward of the pivot line of the wing, etc.

13 Claims, 10 Drawing Sheets

RAM AIR INFLATED WING

FIELD OF INVENTION

The invention relates to aerodynamic devices or wings of a type commonly referred to as kites and in particular to a special category of kite generally referred to as a traction kite, which is used to propel a person across land, ice, snow or water.

BACKGROUND OF THE INVENTION

While the following discussion and description will be provided in the context of traction kiting, this application is not intended to be limiting. The aerodynamic device of the invention may be used in other flying situations.

Unless the context requires otherwise, in the following description the terms "kite" and "wing" are interchangeable and refer to an aerodynamic device that is connected to its operator and/or their ski, skis, skates, board, buggy, or boat, by two or more lines, henceforth called flying lines. These flying lines restrain the kite, allow it to be manoeuvred in the air, and by their extension or shortening relative to each other can be used to effect control of the kite by the operator.

Traction kiting, where a kite is used to propel the kite's operator across the surface of the land, ice, snow, or water is becoming increasingly popular. The flier or operator of the kite dons a ski, or board, or pair of ski's, or skates, or stands on a board, or sits in a buggy or boat or kayak, whichever suits the type of surface and the style of traction kiting they wish to indulge, and uses the kite to harness energy from wind in order to propel themselves and their ski, skis, skates, board, buggy or boat across the surface of the land, ice, snow, or water.

Kite designs may be broadly characterised according to their construction. The range of constructions covers a broad spectrum from framed, semi-framed or unframed single skin kites to double skinned, or "ram air" type kites, to hybrid combinations of these various types. Regardless of their construction type, all kites must have some means of maintaining their spanwise shape while flying.

Four ways of forming or contributing to the form of the spanwise shape of a wing while it is flying are:

Firstly, the use of a rigid or semi-rigid frame.

Secondly, to contrive for air pressurised by being taken from, at or near a flow stagnation point to bleed into internal spaces within the wing, which pressurised air then functions as a structural element. This is referred to as the ram air system after Jalbert (see for example U.S. Pat. No. 3,285,546).

Thirdly, by arranging for some elements of the wing's aerodynamic surfaces to be otherwise than perpendicular to the general axis of the flying lines and set so as to generate aerodynamic forces that cause the wing tips to pull away from each other.

Fourthly, by the use of multiple bridle lines attached to the wing at intervals spanwise and chordwise and converging to the flying lines at a point or points between the operator and the wing. Such bridles, by distributing the tension in the flying lines more evenly over the surface of the wing, reduce the bending load on spanwise structural elements and therefore assisting in the retention of spanwise form.

In the case of kites with rigid or semi-rigid frames, multiple bridles make it possible for these frame elements to be proportionally smaller and lighter, both of which are advantageous to the kite's performance by reducing respectively, drag and weight.

In the case of conventional Jalbert or Parapent style foil kites that use ram air inflation as their structural element, the pressure differential available is so small as to allow no possibility of sufficient spanwise beam strength without support from multiple bridles spaced at intervals spanwise. Because more bridles allow thinner and more aerodynamically efficient aerofoil sections to be used and also permit higher aspect ratio form thereby reducing induced drag there has been a tendency in recent years for parafoil style traction kites to have upwards of 60 bridles.

In the case where aerodynamic forces are used to retain or assist in the retention of spanwise form, multiple bridles reduce the proportion of the kite's aerodynamic surfaces that are required to be other than approximately perpendicular to the flying lines and hence increase the proportion of surface area that can be applied directly to supplying pull on the flying lines. An advantageous consequence of this can be a higher lift coefficient, which manifests as more pull in proportion to overall size.

Bridle lines do however, in themselves, add undesirable drag and can tangle during launching or flying in such a way as to prevent satisfactory operation of the kite.

Traction kites using various combinations of these four contributions to spanwise shape are known and used. Each have inherent advantages and disadvantages by cost, tangle resistance, luff resistance, power for size, upwind efficiency, packing ease, relaunch ease (especially from water), gust responsiveness and other values.

An example of a traction kite using mainly a combination of multiple bridle lines and aerodynamic forces to hold spanwise form is described in WO99/59866. This kite has a very flexible spar or bundle of spars comprising the leading edge of the kite and multiple panels, separated from each other by sets of bridles arranged in the flow wise direction and with these panels arranged and shaped so that the aerodynamic pressure distribution around them provides the major contribution to the spanwise form for the kite.

An example of a traction kite using a combination of only aerodynamic forces and multiple bridles to hold its spanwise form and with no rigid, semi-rigid or ram air structural elements is what has become known as the NASA wing. This kite has a single skin, shaped, and supported by bridles in such a way as to generate aerodynamic forces that are sufficient to form the spanwise and chordwise shape of the kite.

An example of a traction kite using ram air inflation as its spanwise structural element in combination with multiple bridle lines is described in Schimmelpfennig (U.S. Pat. No. 5,033,698). This kite is a double skin ram air inflated envelope with aerofoil profile ribs, without any frame but with multiple bridles distributed spanwise over the surface of the kite, and primarily near to the kite's leading edge, to assist retention of spanwise form. It does not use any significant contribution from aerodynamic forces to hold its spanwise shape beyond a small degree of "arch" form as is commonly used in foil type kites to offset the spanwise components of bridle tension that derives from their convergence to the flying lines.

An example of a traction kite using ram air inflation in combination with a spanwise semi-rigid structural element and some contribution to spanwise form from aerodynamic forces but without multiple bridling is described in U.S. Pat. No. 4,363,458. This kite is a double skin ram air inflated aerofoil with a semi-rigid spar spanning its leading edge. Two only flying lines are used, one attached to each wing tip at the leading edge. The trailing edge of the kite is unsupported by bridles or flying lines.

An example of a traction kite using a semi-rigid frame in combination with a single skin and spanwise aerodynamic forces but without multiple bridles or at least with very few bridles is described in U.S. Pat. No. 4,708,078. This kite has a structure of inflated tubes covered by a flexible skin. The tubes can be inflated through one or more sealable orifices using an inflatable boat pump for example to pressures significantly greater than would be available by ram air inflation. These tubes form a semi-rigid spar along the leading edge of the kite and usually also a series of flow wise orientated spines extending from the leading edge to the trailing edge at intervals across the span of the kite. The tubes must remain correctly inflated to maintain the shape required for the kite to fly satisfactorily.

To date there has been no disclosure of a kite that successfully uses the combination of only ram air inflation and aerodynamic forces to hold its spanwise form.

It is an object of the present invention to provide an improved aerodynamic device, which may be flown as a kite, including as a traction kite, which requires neither rigid nor semi-rigid structural elements spanwise and that, additionally, does not require the use of bridles distributed spanwise, or at least to provide the public with a useful choice.

SUMMARY OF THE INVENTION

According to a broadest aspect the invention provides for a ram air inflated wing including:

- an upper wing surface and a lower wing surface constructed from some flexible material, the upper and lower surfaces being joined along their edges to form an envelope having a leading edge and a trailing edge;
- a plurality of flexible material walls disposed, substantially in a direction parallel to airflow, between the upper and lower surfaces to form a plurality of cells within the envelope;
- one or more openings substantially at or near a flow stagnation point such that air can enter and inflate the envelope;
- at least two flying lines for restraining and controlling the wing, at least one of said flying lines being attached either directly, or indirectly by way of two or more bridle lines, to or near to each end of the envelope; and wherein the wing is adapted near the tips, by shaping of the upper surface and/or lower surface and/or walls, to create aerodynamic forces which maintain the wing's spanwise form while flying.

Preferably the one or more openings may have valves.

Preferably when the wing is laid out flat the line describing the leading edge shall be generally convex rather than straight or concave.

Preferably the upper and lower surfaces near each wing tip are adapted so to impart a residual twist that increases the angle of incidence on the wing tips.

Preferably the wing tips are cut back to a cell inboard of where they would be if the natural, generally convex, lines describing the leading edge and the trailing edge of the envelope were continued to confluence at single point wing tips.

Preferably the center of pressure points within each cell of the envelope, when considered by itself as an aerofoil, shall fall substantially on or near a line described from tip to tip when the wing is laid flat, said line being the pivot line of the wing.

In one embodiment the natural center of pressure points of the cells in the vicinity of the wing tips may be positioned forward of the pivot line.

Preferably the upper and lower surfaces and the walls are adapted so as to impart a substantially conventional aerofoil shape to the spanwise center portion of the wing.

Preferably the upper and lower surfaces and the walls in the area adjacent to each wing tip are adapted so as to impart an increasingly reflexive aerofoil profile near each wing tip.

Preferably the area adjacent to each wing tip includes the outer one third of the span of the wing.

Preferably the upper and lower surfaces in the vicinity of the wing tips are adapted so that the spanwise loads that enter the envelope from the flying lines are not carried along the leading edge in the wing tip area and particularly not along the top surface of the leading edge in the wing tip areas.

Further aspects of the invention will become apparent from the following description which is given by way of example only.

BRIEF DESCRIPTION OF THE DRAWINGS

The invention will be described by way of example and with reference to the accompanying drawings in which.

DESCRIPTION OF THE PREFERRED EXAMPLE

Figure 1:
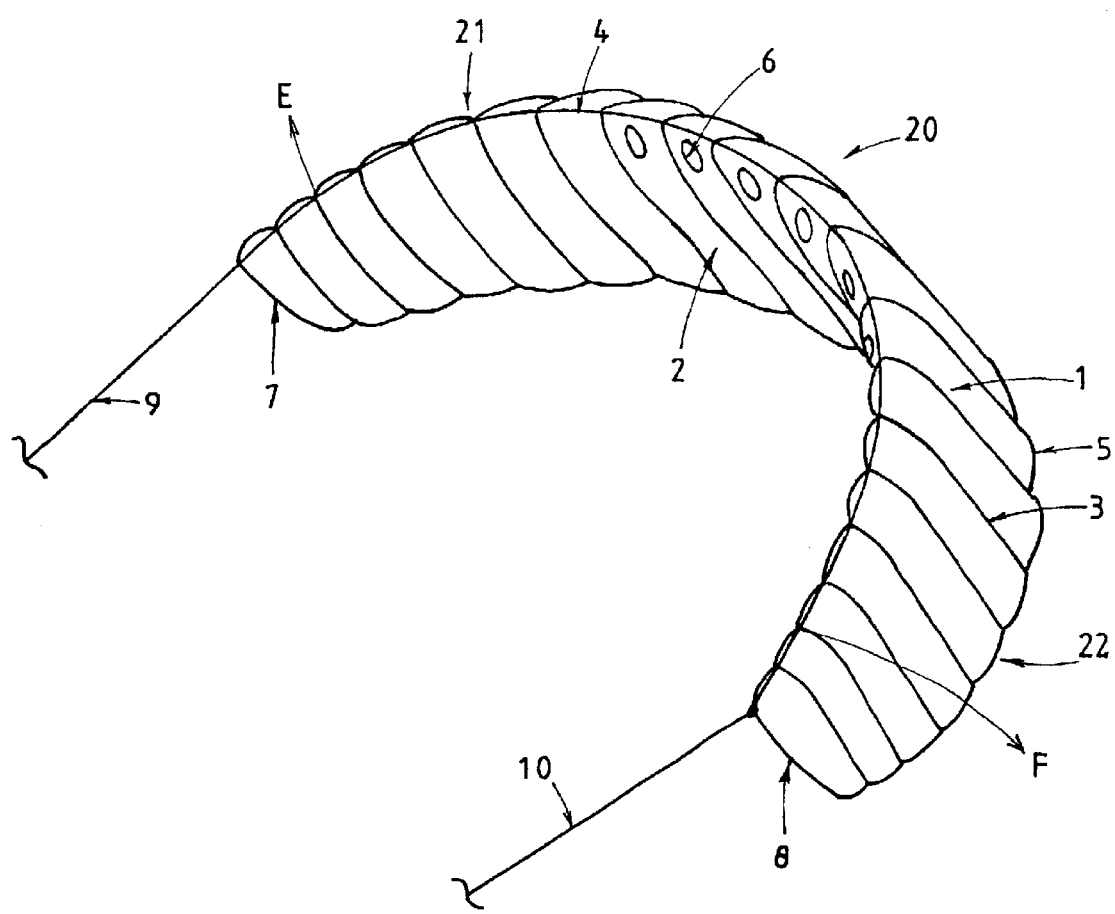
FIG. 1: illustrates a perspective view of an improved wing according to the invention.

A perspective view of a wing according to the invention is shown in FIG. 1. The wing is a double skinned ram air inflated aerofoil profile wing made from flexible lightweight material. One uniqueness of this wing is that it is able to maintain its spanwise, approximately, semicircular shape without any form of rigid or semi-rigid frame at all and without any flying line attachment directly or indirectly through two or more leg bridling to anywhere on the wing except at or near the wing tips 7 and 8.

The embodiment shown in FIG. 1 is a two line wing with single point line attachment, one at each tip 7 and 8. However, to enable greater control the wing can also be made for use with four flying lines, a front and rear line on each end of tip 7 and a front and rear line on each end of tip 8. There are a number of possible arrangements for flying line attachments and some of these will be discussed later.

Figure 2:
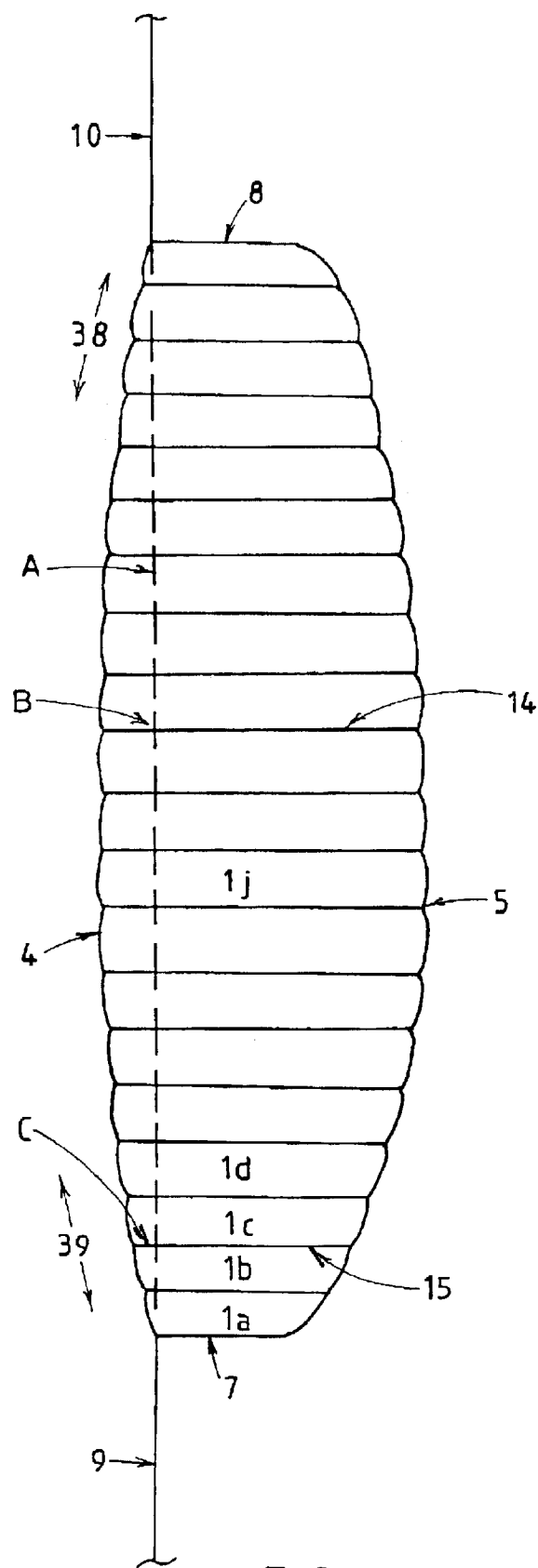
FIG. 2: illustrates a plan view of the wing with the envelope stretched out.

The wing is constructed of an upper fabric skin surface 1 and a lower fabric skin surface 2 joined along their longer edges to provide a leading edge 4 and a trailing edge 5. The upper and lower skins 1 and 2 are each made of a number of smaller panels joined together. This is illustrated in FIG. 2 where the first four panels, 1a, 1b, 1c, and 1d which make up the tip section of upper skin 1 are shown. The upper and lower skins 1 and 2 are also joined at ends, or tips, 7 and 8 to form a generally airtight elongate envelope. There are a number of sheet materials, including fabrics, known in the art that are suitable for constructing such a wing envelope and their methods of joining are well known.

A plurality of interior walls, generally called ribs, 3 are transversely interposed between the upper and lower skins 1 and 2 throughout the interior of the envelope. These ribs 3 subdivide the interior of the envelope into a plurality of compartments generally called cells. The ribs 3 are positioned at regular intervals across the span of the wing. In the current embodiment of the wing there are nineteen ribs 3 and twenty cells although this number is not essential to the invention. It is possible that the wing may be made with a greater or lesser number of cells depending in part upon the wing's span/chord ratio.

The wing can be broadly divided into three sections in its spanwise direction. These are the center section 20 constituting approximately six cells through the center of the span, and the two outside or side sections 21 and 22 which are comprised of seven cells each. These 'sections' are clearly illustrated in FIG. 2. It is to be understood that these figures are based on the current embodiment, which is a nineteen rib wing, and are not critical to the invention.

Each of the cells through the mid span section 20 of the wing envelope has an opening 6 positioned just to the lower skin 2 side of leading edge 4. These openings 6 allow air travelling over the kite's leading edge 4 to enter and inflate the cells. This is known in the art as the ram air system of inflation.

Each rib 3 is provided with an opening or porous section 13 which allows air to pass from the cells that have openings 6 to cells without openings 6. In this way the entire wing envelope becomes inflated. The openings 13 also allow pressure equalisation throughout the interior of the wing envelope.

While in the current embodiment, each of the six center span 20 cells is shown as having an opening 6 it is more usual to space these openings at, for example, every second cell. Openings 6 are not fitted to those cells that are close to the wing tips 7 and 8 to reduce water ingress during relaunching from water surfaces. While in this current embodiment it is also shown that all of the openings 6 are just to the lower skin 2 side of the leading edge 4 it is also more usual to space some of these openings also in the lower skin 2, a little further from the leading edge 4 while retaining others in positions as shown so as to better capture optimum stagnation pressure for ram air inflation when the wing is operating at varying angle of incidence.

When the wing is inflated it assumes aerofoil profile forms in the chordwise plane perpendicular to the upper and lower skins 1 and 2. This aerofoil profile enables the wing to generate lift when air flows passed it in the chordwise direction. In prior art ram air system parapents, parachutes and parafoil type traction kites the aerofoil profile is predominantly determined by a combination of the rib profiles and the positions of and relative lengths of bridles attached to the lower skin.

In this invention, a ram air inflated wing with line attachment or bridling only at or near to the wing tips 7 and 8, the chordwise aerofoil form is primarily determined by the shape of the upper and lower skins 1 and 2. While the rib 3 shapes do have some effect on the aerofoil profiles their primary function is to maintain the desired spacing between the upper and lower skins 1 and 2 at each point rather than controlling the camber of the aerofoils in the chordwise sense. Attempting to effect the chordwise aerofoil form of the wing by changing only the camber of the ribs 3 will, unless the shape of the upper and lower skins 1 and 2 is also adjusted, most likely just cause drag inducing wrinkles without having much effect on the overall shape.

Figure 6:
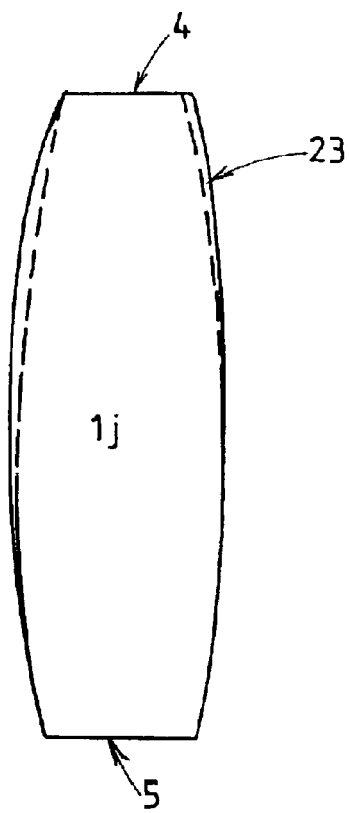
FIG. 6: illustrates the shape of a single center span upper skin panel.

As discussed earlier, the upper and lower skins 1 and 2 are constructed of individual panels. One of these individual panels 1j is shown in FIG. 6. The chordwise and spanwise shape of the upper and lower skins 1 and 2, and therefore the aerofoil profile of the wing at each cell, is largely determined by the shape to which each individual panel, 1a, 1b, 1c, 1d, . . . 1j . . . etc, is cut. The way in which the shape of these individual panels effects the wing shape will be discussed in detail later.

Figure 3A:
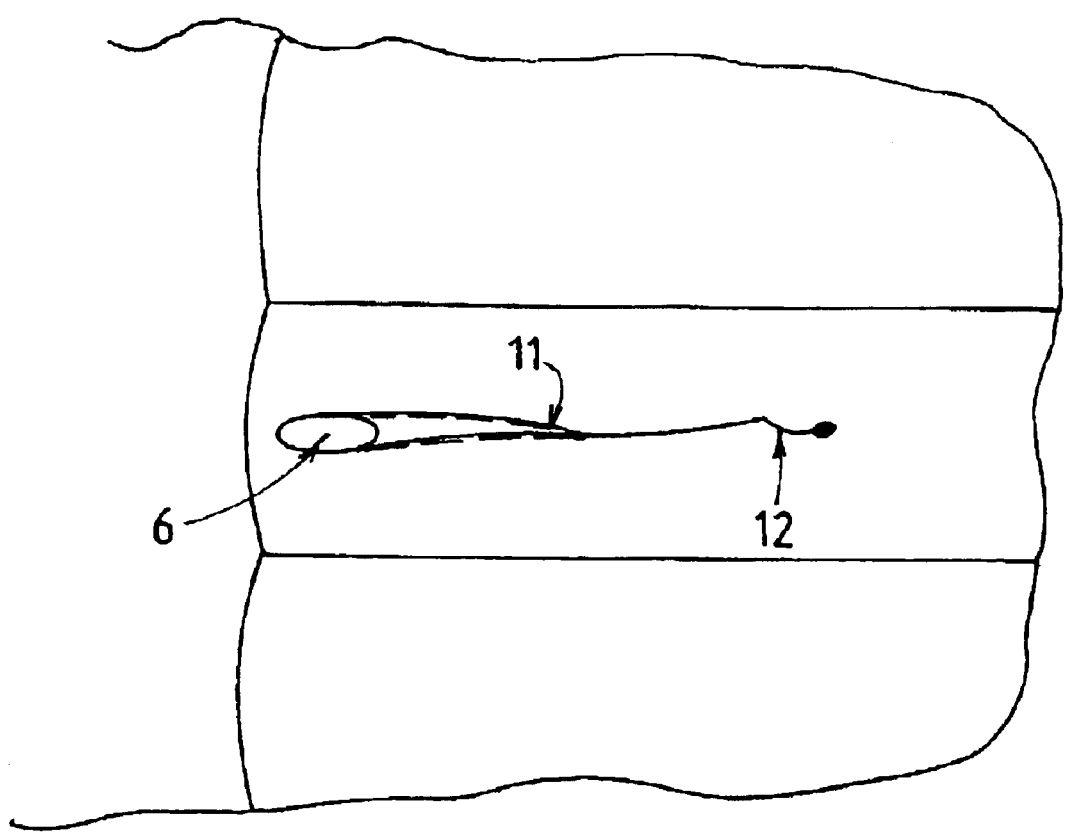
FIG. 3a: illustrates a cutaway plan view of an inflation valve.
Figure 3B:
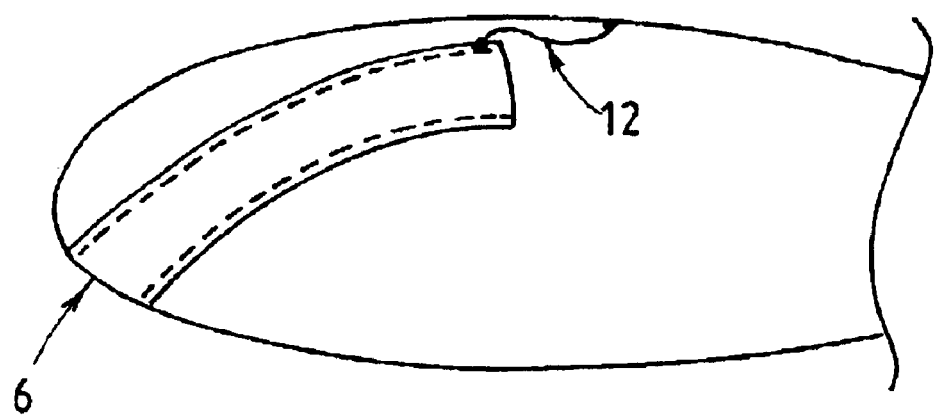
FIG. 3b: illustrates a cutaway side view of the inflation valve.
Figure 4:
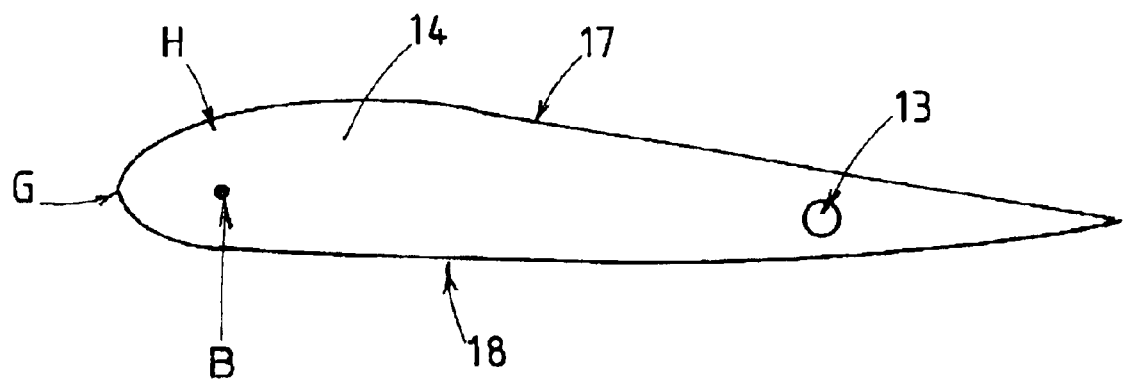
FIG. 4: illustrates an aerofoil profile near the center span of the wing.

Each opening 6 is provided with a valve 11, shown in FIG. 3, which allows air to enter the wing but resists air escaping from an inflated or partially inflated wing. There are a number of methods known in the art for providing such valves. The current invention uses a fabric sleeve or tube 11 through which ram air entering opening 6 can pass but which collapses, sealing opening 6, when the pressure within the cell is greater than the pressure at opening 6. Further, each of these tubes 11 are provided with a restraining cord 12 which prevents the tube turning inside out and extruding out through opening 6 when the internal pressure within the wing greatly exceeds the pressure at opening 6, for example, during a high impact crash.

The above arrangement has several advantages including allowing the wing to be partially or fully inflated before launching is attempted. This is achieved by inserting the output nozzle of a high volume low pressure pump such as a reversed portable vacuum cleaner through one of the openings 6 and valves 11. Pre-inflating the wing in this way is particularly advantageous in that it allows full powered fully controlled flying as soon as the wing is launched rather than the operator having to sustain the wing while it inflates by ram air and while power and control may be less than 100%. Whether or not pre-inflation is applied, maintenance of internal pressure during flight against any leakage is by ram air.

A further advantage of using non-return valves 11 on the openings 6 is that the wing will float when landed on water and will not deflate to the extent that relaunching becomes impossible even after a considerable period. By designing the tubular valves 11 to have significant length in proportion to the average chord dimension of the wing and restraining them with cords 12 loosely to the top skin the possibility of water ingress through the openings 6 is much reduced, even when the wing is orientated leading edge 4 down on choppy water.

Valves 11 also substantially prevent deflation of the wing during short periods of very light wind that are sometimes experienced during stalls and backward flying. Backward flying is a frequently used flying mode for four line versions of the wing.

To deflate the wing after use an open ended stiff tube or pipe may be passed through one of the openings 6 and valve 11. This provides an air passage through the valve 11 while deflation proceeds.

While the preferred embodiment of the wing has a closed leading edge, with inflation through openings 6 and valves 11 this is not essential to the invention. It is possible for the wing to be made with just one elongate opening along its leading edge 4 or with a series of spaced openings distributed spanwise along the leading edge 4 or with an elongate opening or openings that are covered with fine mesh. Such an arrangement is similar to the Flexifoil kite that is described in U.S. Pat. No. 4,363,458. These alternative embodiments are likely to be used on smaller wings for use in nontraction activities such as recreational kite flying and particularly for use by novice fliers who may be more likely to cause high impact crashes that can burst or tear such inflated envelope type kites if there are no openings that will permit the rapid egress of air when internal pressure elevates suddenly. Also, extended non valved openings allow rapid inflation in low apparent winds without the necessity and inconvenience of having access to pumping equipment. This can make launching easier for novices.

One uniqueness of the wing of the current invention is that it contains no rigid or semi-rigid spar or frame members and no bridling through the center span of the wing. In some embodiments of this invention, both two-line and four-line, the flying lines are attached directly to the wing at or very near the wing tips 7 and 8. If some bridling system is used the bridle lines are attached to the wing only at or near to the wing tips 7 and 8.

By the methods that have been applied and features or combinations of features that have been used when attempting to design such wings prior to this invention, such a wing would not be useable in a practicable way for the purposes of traction or recreational kite flying or would at least be of significantly worse performance than the wing of this invention.

The current invention has a number of features which enable the wing to maintain its approximately semicircular shape while flying without either lines or bridling other than at or near the wing tips 7 and 8, or any rigid or semi-rigid frame members.

In order to maintain balance and controllability so that the wing flies correctly, the shape of the wing, as shown in FIG. 2, should be such that the center of pressure of the aerofoil of the wing when it is flying, at every point spanwise, falls on or close to a line A connecting the tips 7 and 8. This line A is the "Pivot line" of the wing. This pivot line A does not necessarily pass through the points defined by the intersection of the wing tips 7 and 8 and the leading edge 4 of the kite.

If the center of pressure of any cell is not on or near Pivot line A then there will be a tendency for the resulting moment of the aerodynamic forces acting on that cell, at a distance from the pivot line A, to either increase or decrease the angle of incidence of that cell. If this moment is sufficiently great and/or if the aerofoil profile of the wing at that point is not sufficiently auto-stable with respect to the characteristics of movement of its center of pressure point with changing angle of incidence then there will be a tendency for the wing to destabilise at that cell. If the destabilisation at the cell is extreme or effects a significant spanwise section of the wing it could destabilise the entire wing.

The above pivot line effect will now be described in detail. If a central span 20 cell was so placed relative to the pivot line A that its aerofoil's center of pressure at the angle of incidence applying to during normal flying of the wing was significantly forward of the pivot line A then that cell would tend towards increasing its angle of incidence relative to that of the wing generally. If this effect was strong enough, or applied to a number of adjacent cells, then the angle of incidence of the entire wing could be also caused to increase, in some cases to the point of stalling which would cause the wing to stop flying. Conversely, if the cell in the above example was so positioned as to have its center of pressure behind the pivot line A then its angle of attack would tend to decrease causing the wing to luff. If this effect was strong enough, or less strong but effecting a number of cells in an adjacent area, the resulting destabilisation often causes kites to crash.

If a cell near wing tips 7 and 8, i.e. in outer span sections 21 and 22, is so placed that its aerofoils center of pressure for the angle of incidence of the wing tip in normal flying is significantly to the leading edge 4 side of the pivot line A then that cell's relative angle of attack will tend to increase. If the moment about the pivot line A of its aerodynamic forces is sufficient, or if a number of adjacent cells are also similarly misplaced relative to the pivot line A and/or if this increase in the cell or cells angle of incidence moves the cell(s) center of pressure point(s) outside the range in which they are self correcting, the wing tip may stall. This causes, at least, the lift to drag ratio for the wing to fall below that which is desirable for traction kites, or in the worst, case stall the entire wing or cause it to become uncontrollable.

If the above wing tip cell center of pressure is to the trailing edge 5 side of the pivot line A then by similar mechanisms the wing tip may be caused to luff which has the effect of collapsing the wing. This form of destabilisation can be dangerous for the operator and is very difficult to recover from.

The aerofoil profile of a typical center span 20 rib 3 can and should preferably tend towards being a standard form of aerofoil optimised for maximum lift as measured by lift coefficient and for maximum efficiency, that is lift to drag ratio, rather than a fully reflexive section as is used and is necessary for the proper functioning of Flexifoil style kites as described under U.S. Pat. No. 4,363,458. Although it is possible to use a fully reflexive aerofoil profile section in this center span 20 area such profiles do not usually have either lift coefficients or lift to drag ratios as good as more conventional aerofoils. Fully reflexive aerofoils do not have good efficiency, as measured by lift to drag ratio, when they are caused to fly at higher angles of incidence and also tend to exhibit undesirable stall characteristics because they do not retain airflow over their top surface well at higher angles of incidence.

It is one characteristic of this invention that center span 20 aerofoil form can be substantially optimised for power and efficiency even while the wing as a whole retains desirable flying characteristics especially in the sense of being resistant to luffing. Notwithstanding the above, traction kites designed according to the principles of this invention may use center span 20 aerofoil forms employing fairly flat rather than significantly convex form over the rear half of their upper surface 1 and somewhat convex lower surfaces 2. This is because such forms, while tending towards the reflexive, can still have very acceptable lift coefficients and lift to drag ratio while also having especially good luff resistance which is desirable for those traction kites that are used in turbulent winds and for extreme manoeuvres. The relative advantages, and design criteria, of various aerofoil profiles will be apparent to the skilled addressee so only some aspects of these will be discussed further.

If a standard form of aerofoil profile optimised for lift coefficient and lift/drag ratio, as described above, is used for the tip sections 21 and 20 of a ram air inflated wing without rigid or semi-rigid framing or bridling distributed across the span then the wing will not consistently hold its approximately semi-circular shape because the tip 7 and 8 sections will collapse inwards. This will happen whenever the angle of incidence of the tip sections becomes significantly negative which will occur when turning is attempted or with fluctuations in the direction of the apparent wind that occur naturally in even mildly turbulent wind. The relationship between angle of incidence and center of pressure for such conventional aerofoil forms is such that the foils do not respond to changes in their angle of incidence in such a way as to preserve a positive angle of incidence as the angle of incidence approaches zero degrees from having been positive.

It is possible to minimise the opportunities for inward collapse of the wing tip sections on a wing while using non-reflexive aerofoil profiles at the tips. This is achieved by constructing and rigging the wing so that the tips have a high positive angle of incidence of say 15 degrees or more in standard flying trim. The drag price of such a solution is such as to reduce the performance of the wing to an undesirable extent.

Even with such high inherent wing tip angle of incidence as, say, 15 degrees there will be occasions during which the apparent wind direction will change sufficiently to cause collapse. To overcome this problem, an aerofoil profile that is auto stable with respect to changes in angle of incidence down to lower and even into negative angles is introduced near wing tips 7 and 8. Reflexive profile aerofoils can have such auto stable characteristics so, for example, could be introduced progressively in the outer one third of each end of the wing span and should be strongly reflexive in the last few cells near each wing tip 7 and 8. In the current embodiment, which has twenty cells, the last four, near the wing tips 7 and 8 are strongly reflexive. As the cells progress in towards center span 20 of the wing the aerofoil profiles become less reflexive.

Figure 5:
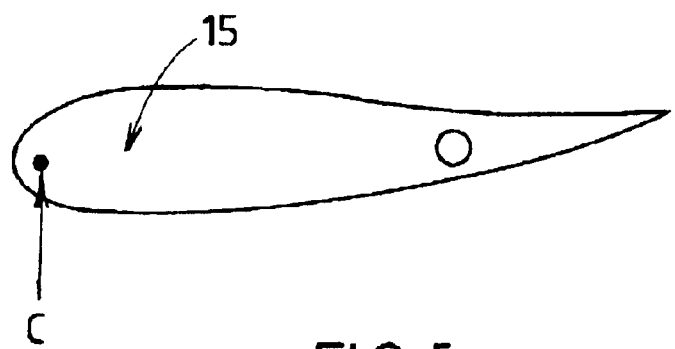
FIG. 5: illustrates the aerofoil profile in the area near each tip of the wing.

An example of a reflexive profile aerofoil is shown in FIG. 5. It's center of pressure C, the point at which all the aerodynamic forces can be thought of as acting through, is close to the leading edge 4 where it would approximately be for angles of incidence in the zero to +5 degree range. Reflexive aerofoils are of a class of aerofoils that to a greater or lesser extent are auto stable in response to changes in their angle of incidence provided that they are sufficiently free from external mechanical constraints to allow self adjustment to occur. With respect to their use in the wing which is the subject of this invention auto-stable means that when, the angle of the apparent wind changes by a few degrees either way, the aerofoil will respond by rotating in such a way as restore the angle of incidence of the aerofoil to the apparent wind striking it back to approximately what it was before the initial change.

The characteristic by which reflexive aerofoils are auto-stable is that when their angle of incidence is increased their center of pressure responds by moving towards the trailing edge, and when their angle of incidence is decreased their center of pressure moves forward. Many aerofoil forms exhibit this characteristic in the range of angles of incidence from +5 degrees upwards but are not auto-stable below about 5 degrees at which angle, unless constrained, they can collapse into a catastrophic self generating luff. Reflexive aerofoils can be auto-stable in a wider range of angle of incidence, for example, in the range from −5 degrees to +5 degrees which is critical for this invention.

In the example of a reflexive aerofoil illustrated in FIG. 5, the center of pressure C is close to leading edge 4, which is about where it would be for angles of incidence in the zero to +5 degree range. Referring back to FIG. 2, it can be seen that the center of pressure, marked by point C at rib 15, is just forward of the pivot line A. The wing of the invention will hold its form during flight satisfactorily if the pivot line A passes through a point, at each cell, within the range in which the center of pressure of the aerofoil profile of that cell is auto-stable. In fact, because the fully inflated envelope that forms the wing has some appreciable torsional rigidity in relation to the aerodynamic forces operating on any individual cell some minor deviations from the above pivot line principle are possible without deleteriously effecting the functioning of the wing in an overall sense.

Some deviation can be desirable for various subsidiary reasons. One reason is the positioning of cells towards the wing tips a little forward of their optimum position so that their angle of incidence, measured in a flow wise plane normal to the lower skin 2 tends to be greater than that of the more central cells measured ditto. The effect of this is to further reduce the risk of wing tip collapses during sudden changes of apparent wind direction. The minor cost for this is a little more overall drag which is, in any case, somewhat offset by the increased span and hence projected area of the wing overall which derives from the tips 7 and 8 having a greater outward tendency. The overall pull from the wing will therefore be slightly increased while the lift to drag ratio will be only marginally decreased provided that angle of incidence increase at the tips is not extreme. The use of this deviation from the strict application of the pivot line rule is denoted in FIG. 2 by indicating a "nominal" center of pressure point for it from FIG. 5 as being just forward of, rather than exactly on, the pivot line A.

Although, as suggested above, the inflated envelope of the wing which is the subject of this invention has appreciable torsional rigidity this is more true towards the center span area where each cell is constrained from either side, while being less true towards the tips which can therefore pivot freely enough to allow the auto stable aerofoils used in the wing tip area to self adjust.

Another feature of this embodiment of the invention is the smoothness of the upper leading edge 4 area through the center span 20 of the wing. Attaining smoothness in this area is particularly important to reduce drag and to assist in the retention of attached flow over the top surface of the wing to higher angles of incidence than is possible if this area were less smooth. This results in a desirable reduction in the wing's tendency to stall which can be used to increase the pull from the wing without increasing its size.

Improved smoothness in this most critical area is accomplished be causing proportionally more of the spanwise loads carried in the skins to be taken through the upper leading edge 4 area, and this in turn is accomplished by adjusting the cut of the panels, for example 1j, that make up the upper skin surface 1 through the center 20 of the span. An example of how this is accomplished is shown by FIG. 6 which illustrates panel 1j. Panel 1j is cut to be narrower near leading edge 4, shown by the dashed line 23, than it would be if the objective had been to distribute the spanwise skin loads more evenly in a chordwise sense. In this case it would have been cut to the shape shown by the solid lines. In the embodiment shown, the upper skin panels near the wing tips 7 and 8 are not cut similarly to panel 1j because in this area such tightening of the upper leading edge 4 increases the risk that the tips 7 and 8 will collapse inwards during flight.

Another advantageous feature of this embodiment of the invention is the shaping of the wing tip 7 and 8 lower skin 2 areas to assume convex form, when viewed from the operator's side of the wing even before full inflation is accomplished. Until the wing tip sections 21 and 22 fully inflate into reflexive aerofoil forms there is little to resist the inwards force applied to the tips 7 and 8 by the spanwise component of flying line 9 and 10 tension and by occasional changes in apparent wind that tend to force the tips 7 and 8 inwards. Therefore, before inflation is complete, the wing has an undesirable tendency to collapse. Shaping the lower skin 2 in the wing tip areas 21 22 into convex form causes the wing tips areas 21 and 22 to be quite resistant to collapsing inwards even before full inflation is accomplished. This is because such convex forms generate outward aerodynamic forces.

In addition to shaping the lower skin 2 to have this form it is also desirable that the flying line 9 and 10 loads are carried into the wing envelope primarily by way of the lower skin 2 rather than by the upper skin 1 at the wing tips 7 and 8. The transferred flying line load tensions the lower skin 2 in the wing tip areas into the desirable convex shape they have been cut to. If the flying line tension was transferred into the wing envelope by way of the upper skin 1, which is cut to form the upper part of reflexive aerofoil profile in wing tip areas 21 and 22 when fully inflated, the tip areas 21 and 22 present a concave form aerofoil until inflation is complete. This could cause the tips to collapse inwards at the slightest provocation.

Figure 7:
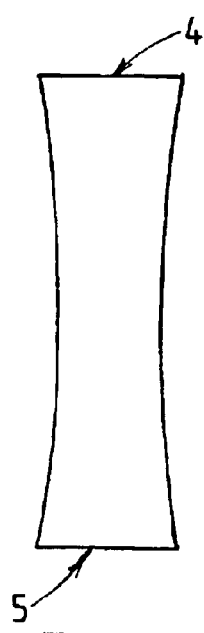
FIG. 7: illustrates the shape of a single center span lower skin panel.

An example of how the lower skin 2 is cut so as to assume a convex shape in the wing tip areas 21 and 22 is shown in FIG. 7. Panel 2a is cut to be wide at the leading edge 4, narrower in the central chord area and wider again at the trailing edge 5. In this embodiment all the lower skin panels in the tip areas 21 and 22 are cut in this way to some extent, with the amount of narrowing being greater for panels towards the tips 7 and 8 and less in panels nearer to the center section 20.

Figure 8:
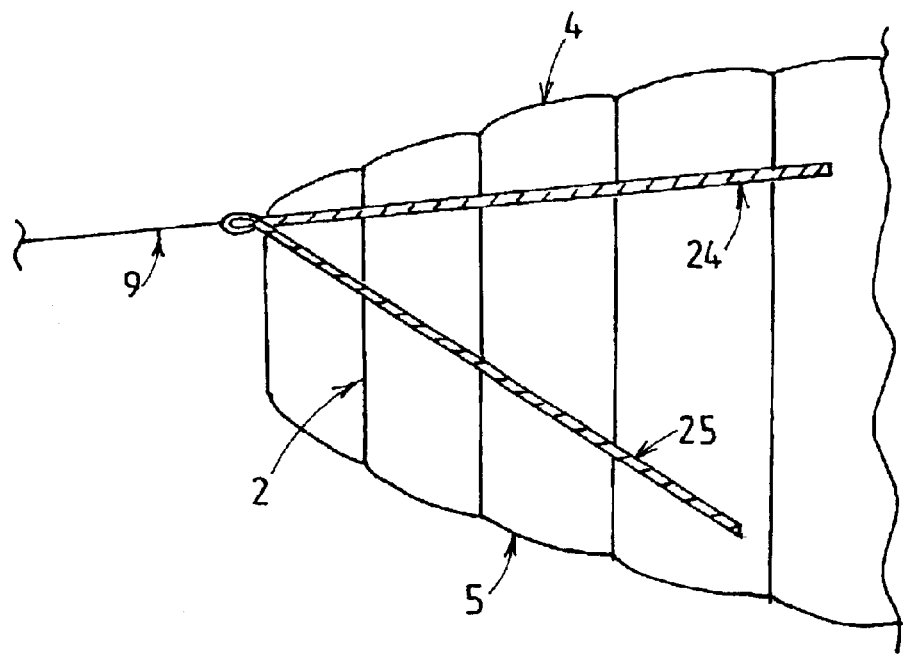
FIG. 8: illustrates a method of spreading the load from a line attachment point out into the lower skin of a 2 line wing.
Figure 9:
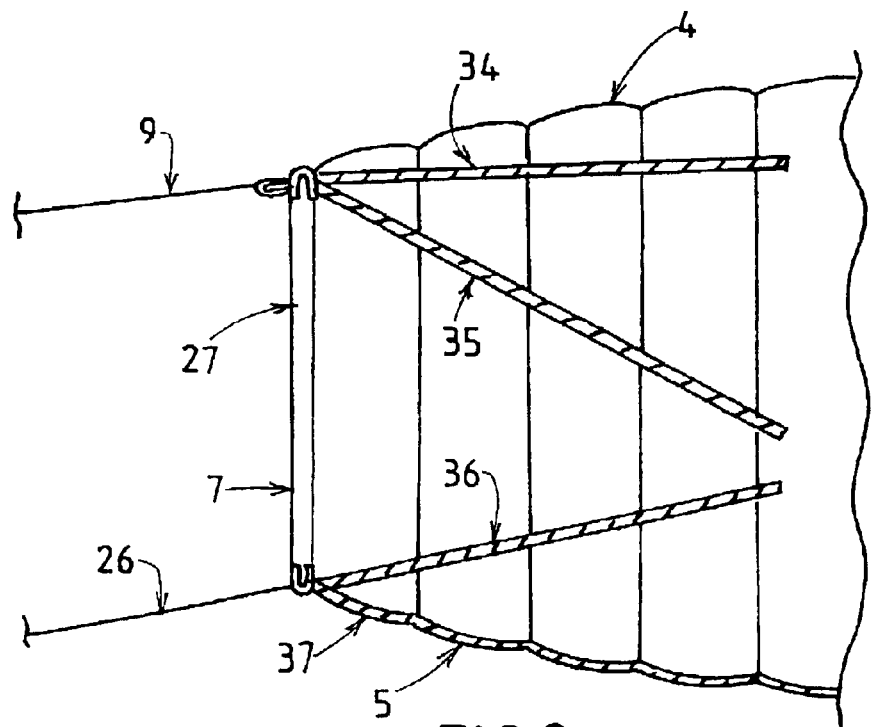
FIG. 9: illustrates the tip batten pocket and lower skin line attachment point reinforcing for a 4 line wing.

An example of how the flying line 9 and 10 loads are transferred into the envelope of the wing primarily through the lower skin 2 in the tip areas 21 and 22 is shown in FIGS. 8 and 9. Reinforced strips, 24 and 25 in the case of the two line embodiment shown in FIG. 8 and 34, 35, 36, and 37 in the case of the four line embodiment shown in FIG. 9, are attached to the lower skin 2 in the pattern depicted in the respective Figures. To further ensure that the flying line loads transfer primarily to the lower skin 2, the two upper skin panels nearest to the wing tip 7 and 8 are cut more full at their leading edge 4 and trailing edge 5 ends. This extra fullness, while not distorting the aerofoil form of the end cells to any unacceptable degree, ensures that tension loads can not pass from where the flying lines or bridles are attached to the wing at the wing tips 7 and 8 directly into the upper skin 1. The tension loads must pass first into the lower skin 2 and then gradually cell by cell into the upper skin 1 around the leading edge 4, the trailing edge 5 and by way of the ribs 3.

Figure 13:
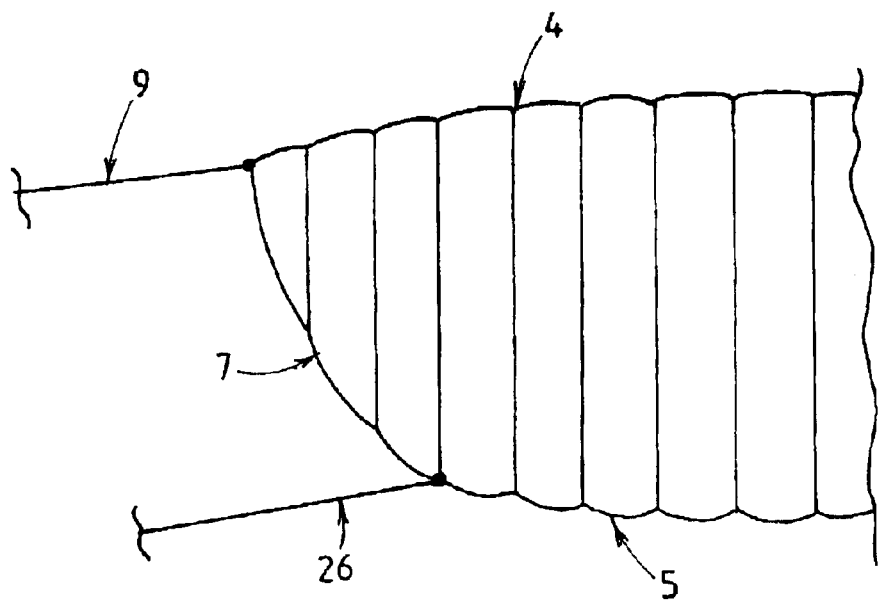
FIG. 13: illustrates a plan view of a wing stretched flat showing alternate wing tip shape.

A further feature of this embodiment of the invention is that the upper and lower skin panels nearest the wing tips 7 and 8 are cut so that their leading edges 4 are longer by about 5% than they would be if their aerodynamic profile was the only criteria used in determining their shape. This is done to prevent the front flying lines 9 and 10 loads, where they enter the envelope at the wing tips, from transferring into the center span 20 of the wing, where the majority part of the kite's pull is generated, by way of the leading edge 4 and particularly by way of the upper leading edge area 21 and 22 at the tips. See FIG. 13. Tension loads transmitted from the center span area 20 must be turned through approximately 90 degrees before they can be resisted by the flying line loads and this change of direction has an inward component in the shoulder areas 38 and 39 which if taken through the leading edge in the four or five cells nearest to each tip 7 and 8 can cause the leading edge sections in this area to pull inwards which can initiate wing tip and hence wing collapse. It is therefore an object of the design and shaping of the panels in the wing tip areas 21 and 22 and the positioning of the reinforcements 24 and 25 that transmit the flying line loads into the wing envelope to keep spanwise tension loads away from the leading edges in the wing tip areas as much as possible without unacceptable distortion of the aerofoil profiles in these areas.

Figure 15:
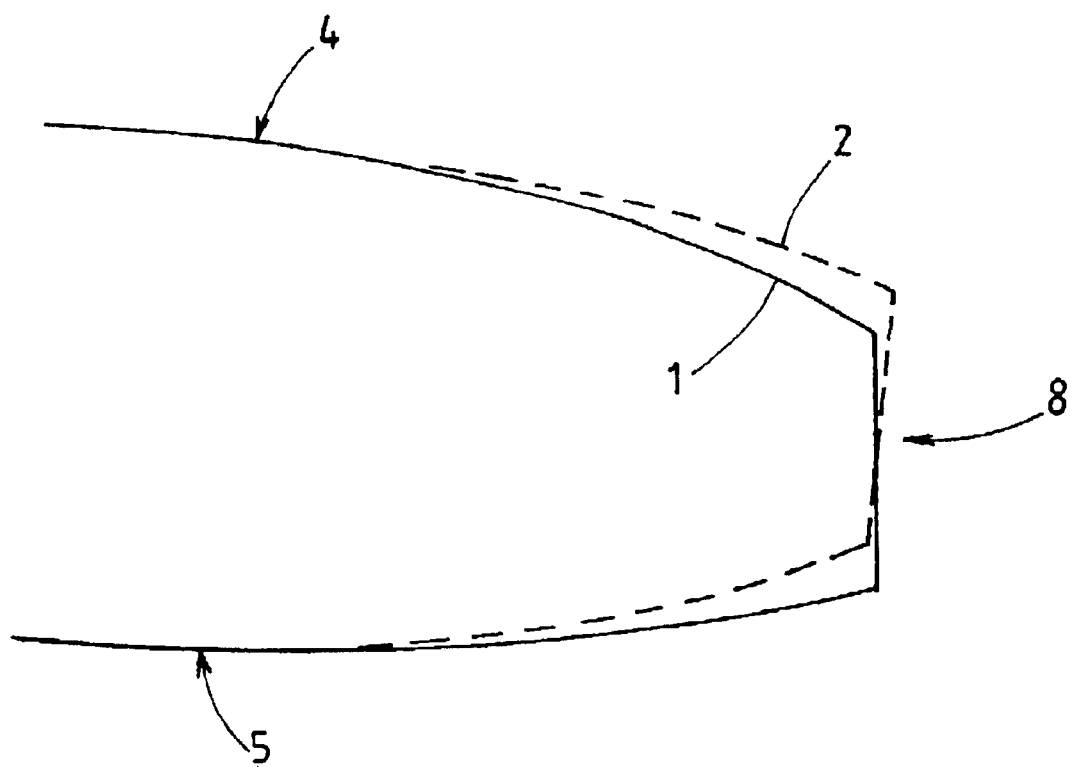

A further feature of this embodiment of the invention is the variation in leading edge 4 shapes of the upper skin 1 and the lower skin 2 when each is separately laid out flat prior to incorporation in the wing. Referring to FIG. 15, in particular, the top skin 1 has significantly more sweep back towards the tips than the lower skin 2, which is shown by the dashed line. When assembled with ribs and joined at the trailing and leading edges 4 and 5 to form the wing envelope, there will then be some residual built in twist which has the effect of providing positive angle of incidence at each tip 7 and 8 relative to the centre span 20 of the wing. This is of great benefit in preventing inward collapse of the tips in stalled and low apparent wind speed conditions before the aerodynamic forces generated by wing tip profile reflexivity become more efficient in this task.

A further feature of this embodiment of the invention is that the panels that make up the lower skin 2 in the center chord area are cut a little wider than they normally would be to match the semicircular form the wing assumes when flying. Conversely the panels that make up the upper skin 1 are cut a little narrower in their central chord areas. The effect is that when the kite is unloaded the wing envelope will tend to flatten, or open, out from its flying shape which is advantageous in terms of readying the kite for relaunching during which any tendency for the wing to roll up rather than open out can cause difficulties.

The choice between two and four line embodiments of this invention is predominantly one of desired characteristic. Two line wings have less lines to tangle while launching and during flying and the lower line drag from just two flying lines results in either better upwind performance or the choice of using longer lines for the same upwind performance relative to four line embodiments. Four line embodiments have quicker steering and a measure of almost instantaneous power control by using the rear lines to change the wing's angle of attack and hence its pull. If designed with sufficiently wide wing tips 7 and 8 relative to the chord at center span they can also be launched and flown backwards which is an advantage in many situations. With this wider tips 7 and 8 the applying of load to the rear lines, commonly called the brakes, by manipulation of the operators handles or bar can cause the wing tips 7 and 8 to assume a chordwise cambered or concave form. At some intermediate state between no brake line tension and enough brake tension to stall the wing, this chordwise camber may cause the tips to luff collapsing the wing. There are a number of ways to prevent this undesirable characteristic.

One method is to cut the wing tip panels so that the cells adjacent to the wing tips 7 and 8 are sufficiently large in cross section that when there is full inflation the end cells have adequate bending strength to resist this cambering tendency. Another method is to fit a rigid or semi-rigid batten chordwise or diagonally to each wing tip or near to each wing tip 7 and 8. A further method is to fit a sealed bladder to each of the wing tip cells that can be pump inflated to pressure greater than available from ram air inflation. This solution has the advantages of not increasing the dimensions of the kite when packed away and also of providing some residual flotation in the case that the wing becomes totally deflated while in the water through damage or other cause. A final method is to support the tip along its chord with multiple bridle lines that converge to the flying lines at some distance from the tip sufficient that the chordwise components of the loads in these bridles are insufficient to compressively buckle the wing tip even in the absence of battens, bladders or full inflation.

A number of suitable bridles for tips 7 and 8 are known in the art. It is of course possible, for the flying lines of a two line wing or for the front lines only of a four line wing, to use a conventional fixed leg multiple bridle attached in various places along the wing tips 7 and 8 and converging to the respective flying lines 9 and 10 at some distance down from the wing. A disadvantage of this system is that it limits the capacity of the wing to modify its angle of incidence by rotating around a point close to the wing itself with the consequence that wings so rigged tend to suffer from an undesirable tendency to stall when flying at a low angle to the true wind direction. Two bridle systems that can be used to spread the flying line loads to the wing tips while allowing changes to the relative tension on front and brake lines for four line wings are known. One is the crown or arch bridle and the other is the cross bridle but both of these are less than perfect in preventing unwanted cambering of the wing's tips at intermediate states between full front line and full brake line load and both systems also cause the stalling characteristics as described for the fixed leg bridles above.

Figure 10:
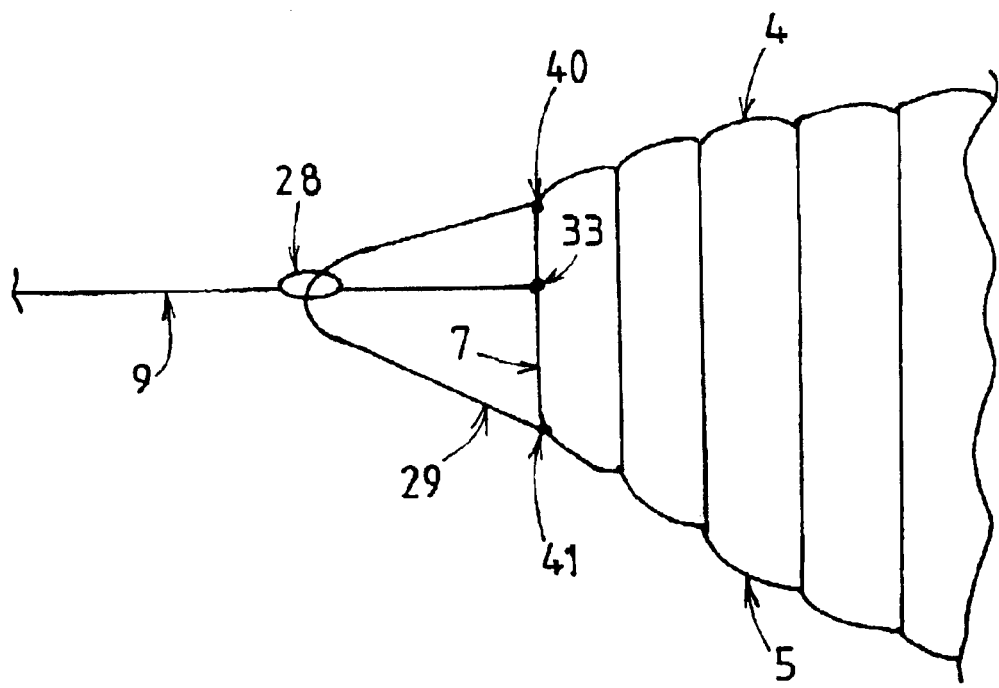
FIG. 10: illustrates a sliding bridle system which provides extra wing tip support for a 2 line wing.

A bridle arrangement suitable for two line embodiments of this invention and devised by the applicant is shown in FIG. 10. This bridle allows the tip 7 and 8, to be supported at three spaced points 40, 41 and 33 while behaving, incidence angle wise, as if there is but one bridle point and 33 thereby eliminating the undesirable stalling characteristics of conventional multi leg bridles. Line 9 has a ring or pulley 28 secured to it about two tip chord lengths out from the tip 7. A line 29 is attached to the tip 7 adjacent to leading edge 4, taken through the ring or pulley 28 and attached to tip 7 adjacent to trailing edge 5. Ideally the path of line 29 is such as to form a continuation of edges 4 and 5 to a virtual apex at the location of the ring or pulley 28. Because line 29 can move freely through ring or pulley 28 the bridle supports tip 7 against buckling under compressive loads but allows the wing to pivot around line 9 as though there was only a single flying line attachment point at 33. An additional advantage of this arrangement over even single point bridles is that by adjusting the relative lengths of line 29 and the distance between ring or pulley 28 and the point 33 it is possible to tune the flying characteristics of the wing with respect to the desired degree of wing tip reflexivity and to adjust for minor lateral asymmetry's.

Figure 11:
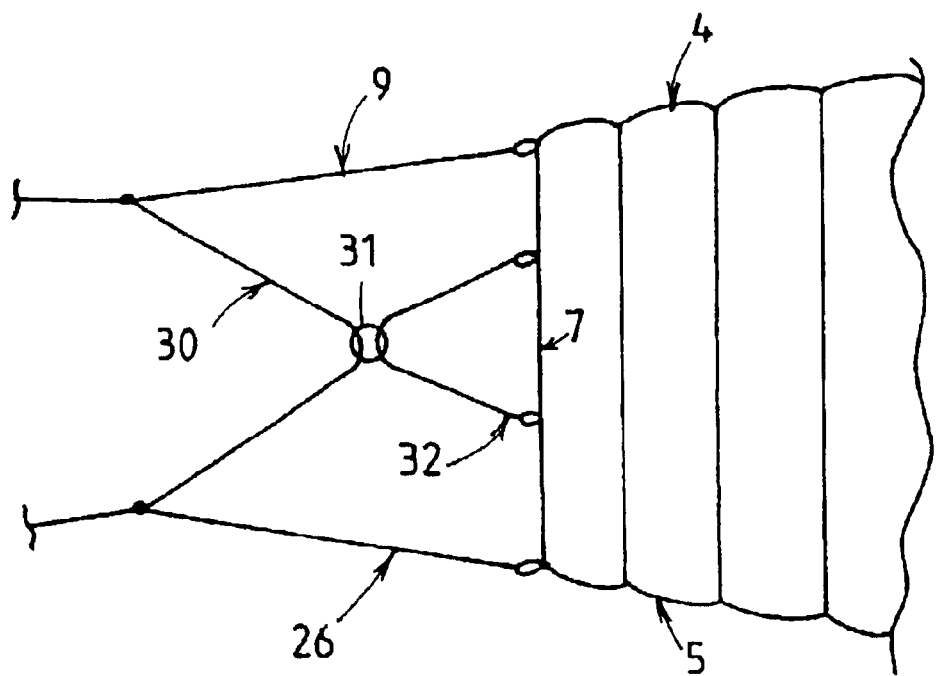
FIG. 11: illustrates a sliding bridle system which provides extra wing tip support for a 4 line wing.
Figure 12:
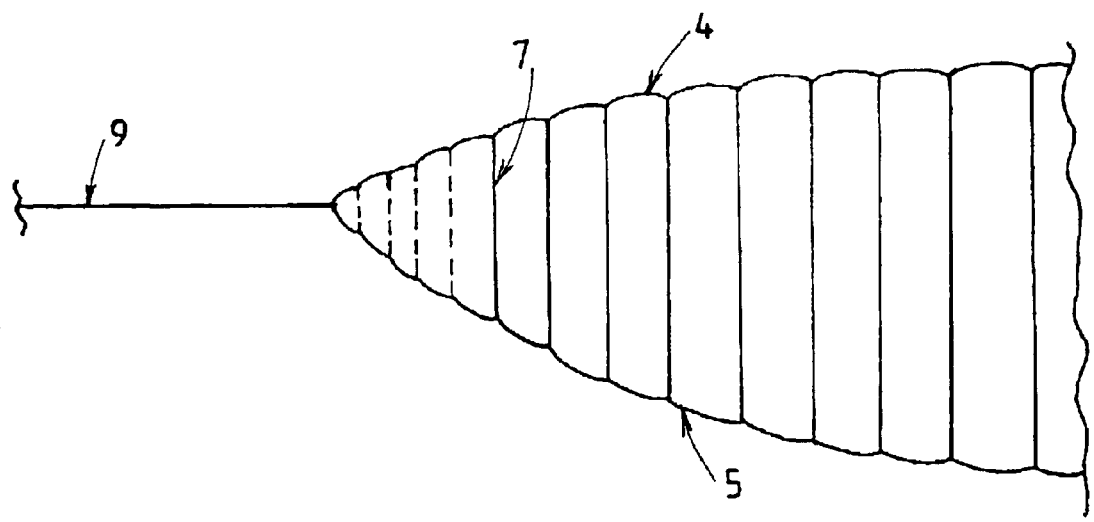
FIG. 12: illustrates a plan view of a wing stretched flat showing the wing tips cut back to reduce drag and to minimise stalling tendencies.

A bridle suitable for four line embodiments of this invention and devised by the applicant is shown in FIG. 11. This bridle has a line 32 attached at either end to tip 7, or 8. The attachment points are evenly spaced between the attachment points of flying lines 9 and 26. A second line 30 is attached between the flying lines 9 and 26 at about four times the tip chord dimension from where the lines 9 and 26 attach to the kite. A ring or double pulley 31 connects lines 30 and 32 so that the tip 7 is supported. Because the ring or pulleys at 31 allow lines 30 and 32 to move relative to each other the operator is enabled to transfer load from entirely on the front line 9 to entirely on the brake line 26 while at every intermediate stage supporting the tip 7 evenly at the attachment points of line 32. This support is sufficient to prevent collapse of the tip even when the wing is not fully inflated, provided that this arrangement is correctly constructed. An additional advantage of this arrangement over single point bridles is that by adjusting the length of line 32 it is possible to tune the flying characteristics of the wing with respect to the desired degree of wing tip reflexivity and to adjust for minor lateral asymmetry's.

Notwithstanding that the wing that is the subject of this invention requires no spanwise stiffening or framing there may be occasions when it will be desirable to use a pre-inflated tube around a portion of its leading edge 4 to provide additional resistance to shoulder collapsing while launching when the wing is less than fully inflated. This is especially advantageous when launching from water as it provides some residual flotation in case of complete deflation. While it is possible that the pre-inflated tube can span the entire wing it would only be needed in the wing tip sections 21 and 22.

Also, notwithstanding that two, three, four, or more lines in total can be used to restrain and control the wing all of these lines may converge into as few as one flying line at some point between the operator and the kite. In the case that the operator has available other remote means such as a radio/servo mechanism for exercising control. Such an arrangement can be advantageous particularly for larger scale kite sailing applications because it allows the use of simpler winch systems for the letting out and pulling in of the kite.

Also, the wing that is the subject of this invention may be flown in multiples or stacks as well as individually. The minimal or no bridle feature of this invention makes these wings very suitable for stacking in that successive wings can be rigged so as to be in the form of a ladder without the necessity for rigging to pass through any part of the envelope of lower wings in the stack. Stacks of kites have greater propensity to tangle during launching and at other times than individual kites but changing the number of kites in the stack is a very convenient means of adjusting total line pull for different wing strength. For users there can also be cost benefits in doing this as less total investment in kites will be required to cover a given wind range. Also, a stack of smaller kites will have advantageously sharper turning than just one larger kite for the same total pull.

Figure 14:
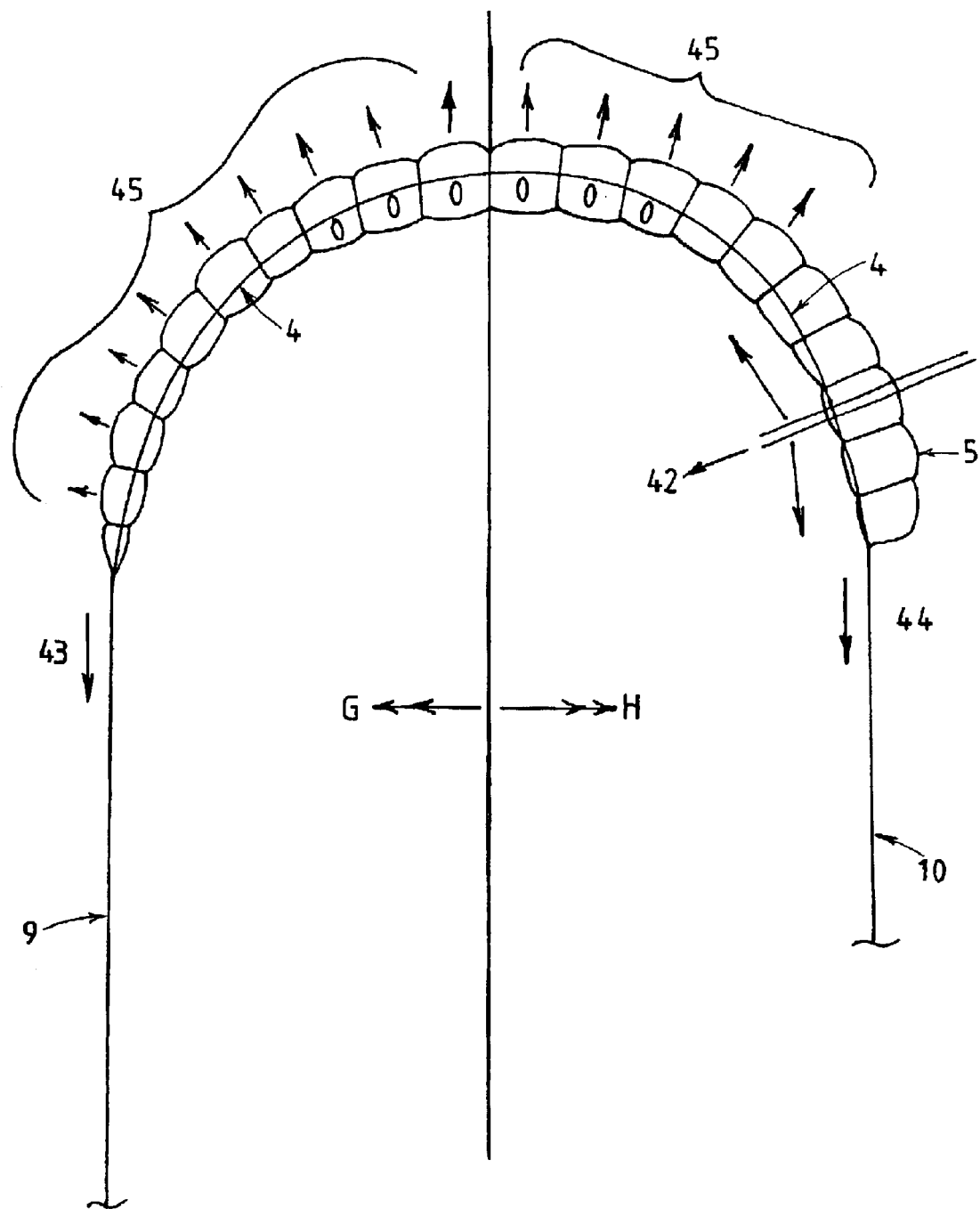
FIG. 14: illustrates a flow-wise view of the wing showing required shape on one side and leading edge distortion initiating inward collapse on the other side; and, FIG. 15: illustrates a plan view of leading edge shapes of upper and lower skin showing different curves used to create inherent twist for a positive incidence at tips.

FIG. 14 shows a flow wise view of the wing. It illustrates the required wing shape on side G, and the leading edge distortion which initiates inwards collapse 42 on side H. The flying line load is indicated by 43 and 44 and the aerodynamic forces on the wing by 45. The wing collapse is initiated by transfer of lift forces from the center span 20 to the flying line by way of the leading edge 4, exacerbated by stalled flying.

By a combination of constructional features described above the applicant has been able to produce a ram air inflated flying wing without any bridling through the span of the wing or any frame or stiffening to maintain the spanwise form of the wing when flying. The wing so constructed is entirely self supporting and eminently useable by controllability power and efficiency for kite traction, recreational kite flying and other purposes. To the best knowledge of the applicant this has not been previously achieved even although some of the constructional features described above are known in the art.

Where in the foregoing description, reference has been made to specific components or integers of the invention having known equivalents, then such equivalents are herein incorporated as if individually set forth.

Although the invention has been described by way of example and with reference to possible embodiments thereof, it is to be understood that modifications and/or improvements may be made thereto without departing from the scope or spirit of the appended claims.

What is claimed is:

1. A ram air inflated wing, comprising:
    an upper wing surface and a lower wing surface constructed from a flexible material, the upper and lower surfaces being joined along their edges to form an envelope having a leading edge and a trailing edge;
    a plurality of flexible material walls disposed, substantially in a direction parallel to airflow, between the upper and lower surfaces to form a plurality of cells within the envelope;
    one or more openings, substantially at or near a flow stagnation point such that air can enter and inflate the envelope;
    at least two flying lines for restraining and controlling the wing;
    wherein:
        at least one of said flying lines is attached either directly or indirectly to or near to each respective end of the envelope;
        the wing is bridleless over the entire span of the wing apart from tips of the wing; and
        the outer sections of the wing create aerodynamic forces which maintain a generally arc shaped spanwise horizontal form of the wing while flying.

2. A wing in accordance with claim 1, wherein said wing has two flying lines.

3. A wing in accordance with claim 2, wherein each flying line is connected to each end of the envelope by way of two or more bridal lines.

4. A wing in accordance with claim 1, wherein said wing has four flying lines, each wing tip having a flying line connected at or near its leading edge and a flying line connected at or near its trailing edge.

5. A wing in accordance with claim 1, wherein the upper and lower surfaces near each wing tip are adapted so as to impart a residual twist that increases an angle of incidence on wing tips while flying.

6. A wing in accordance with claim 5, wherein regions of the wing adjacent to each wing tip are constructed so as to impart an increasingly reflexive aerofoil profile near each wing tip while flying.

7. A wing in accordance with claim 6, wherein the regions adjacent to each wing tip includes an outer one third of the span of the wing.

8. A wing in accordance with claim 1, wherein the one or more openings have valves.

9. A wing in accordance with claim 1, wherein a line describing the leading edge of the wing, when viewed in plan, is generally convex rather than straight or concave in the regions near the wing tips.

10. A wing in accordance with claim 1, wherein the upper and lower surfaces and the walls are adapted so as to impart a substantially conventional aerofoil shape to the spanwise center portion of the wing.

11. A wing in accordance with claim 1, wherein a natural center of pressure points of the cells in the vicinity of the wing tips are positioned forward of a pivot line extending from wing tip to wing tip when the wing is laid flat.

12. A ram air inflated wing, comprising:
    an upper wing surface and a lower wing surface constructed from a flexible material, the upper and lower surfaces being joined along their edges to form an envelope having a leading edge and a trailing edge;
    a plurality of flexible material walls disposed, substantially in a direction parallel to airflow, between the upper and lower surfaces to form a plurality of cells within the envelope;
    one or more openings, substantially at or near a flow stagnation point such that air can enter and inflate the envelope;
    at least two flying lines for restraining and controlling the wing;
    wherein:
        at least one of said flying lines is attached either directly or indirectly to or near to each respective end of the envelope;
        the wing is bridleless over the center of its span;
        the outer sections of the wing create aerodynamic forces which maintain a generally arc shaped spanwise horizontal form of the wing while flying;
        the wing has four flying lines, each wing tip having a flying line connected at or near its leading edge and a flying line connected at or near its trailing edge.

13. A wing in accordance with claim 12, wherein the wing is bridleless over the entire span of the wing apart from tips of the wing.

* * * * *